Figure 7:
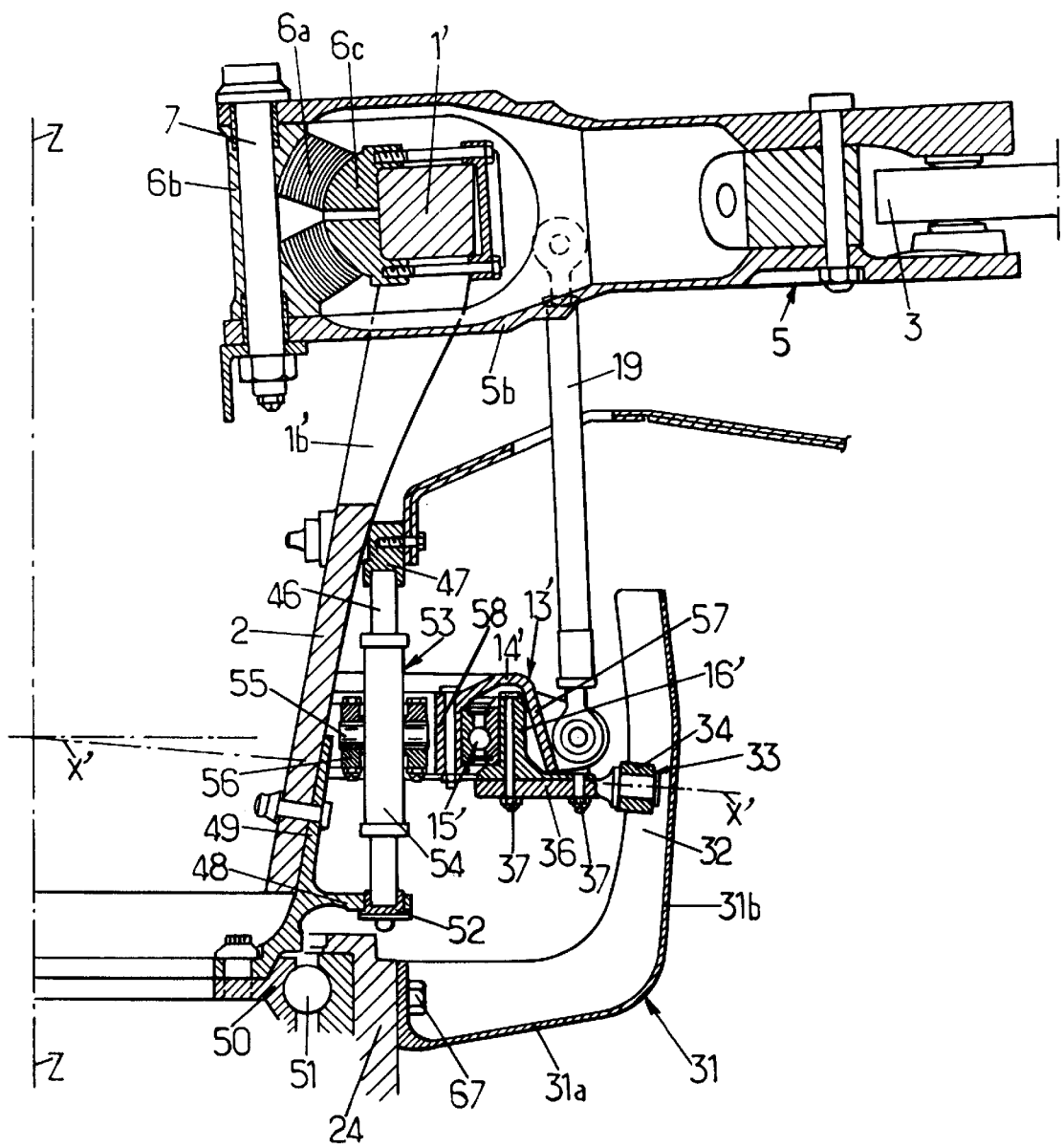

United States Patent [19]
Rampal

[11] Patent Number: 6,033,182
[45] Date of Patent: Mar. 7, 2000

[54] SWASH-PLATE DEVICE FOR CONTROLLING THE PITCH OF ROTOR BLADES WITH NON ROTATING PLATE STOP TRACK AND PIN

[75] Inventor: Etienne Rampal, Marseille, France

[73] Assignee: Eurocopter, France

[21] Appl. No.: 09/154,655

[22] Filed: Sep. 18, 1998

[30]     Foreign Application Priority Data

Sep. 30, 1997 [FR] France .................................. 97 12127

[51] Int. Cl.[7] ................................................. B64C 27/605
[52] U.S. Cl. ......................... 416/114; 416/115; 416/116; 416/134 A; 416/140; 416/141; 416/138; 74/579 R; 244/17.25
[58] Field of Search .................................... 416/114, 115, 416/116, 134 A, 140, 141, 138; 244/17.25; 74/579 R

[56]           References Cited

U.S. PATENT DOCUMENTS

| | | | |
|---|---|---|---|
| 3,738,772 | 6/1973 | Parenti | 416/114 |
| 4,732,540 | 3/1988 | Mouille . | |
| 4,952,120 | 8/1990 | Aubry et al. | 416/114 |
| 5,135,356 | 8/1992 | Sherperd . | |
| 5,209,429 | 5/1993 | Doolin et al. | 244/17.11 |
| 5,340,279 | 8/1994 | Cycon et al. | 416/134 A |
| 5,599,167 | 2/1997 | Daldosso | 416/108 |
| 5,906,476 | 5/1999 | Arlton | 416/114 |

FOREIGN PATENT DOCUMENTS

| | | |
|---|---|---|
| 36 03 400 | 5/1987 | Germany . |
| 36 20 794 | 12/1987 | Germany . |

*Primary Examiner*—Edward K. Look
*Assistant Examiner*—Matthew T. Shanley
*Attorney, Agent, or Firm*—Piper Marbury Rudnick & Wolfe

[57]            ABSTRACT

The non-rotating plate of the device is stopped from rotating around the rotor axis by a stop arm with at least one rigid stop track extending substantially axially and secured to the structure of the rotor aircraft. The track works together with a stop pin, integral with the non-rotating plate to stop the latter from rotating. The track has two flanges between which the pin is engaged so as to follow on this track a straight trajectory, parallel to the rotor axis and a circular arc trajectory centered on this axis, in the case of variation in the collective and cyclic pitch respectively. The stop pin includes a pad sliding between the two flanges of a slide constituting the said track and hinged around its fastening axis on the non-rotating plate.

15 Claims, 4 Drawing Sheets

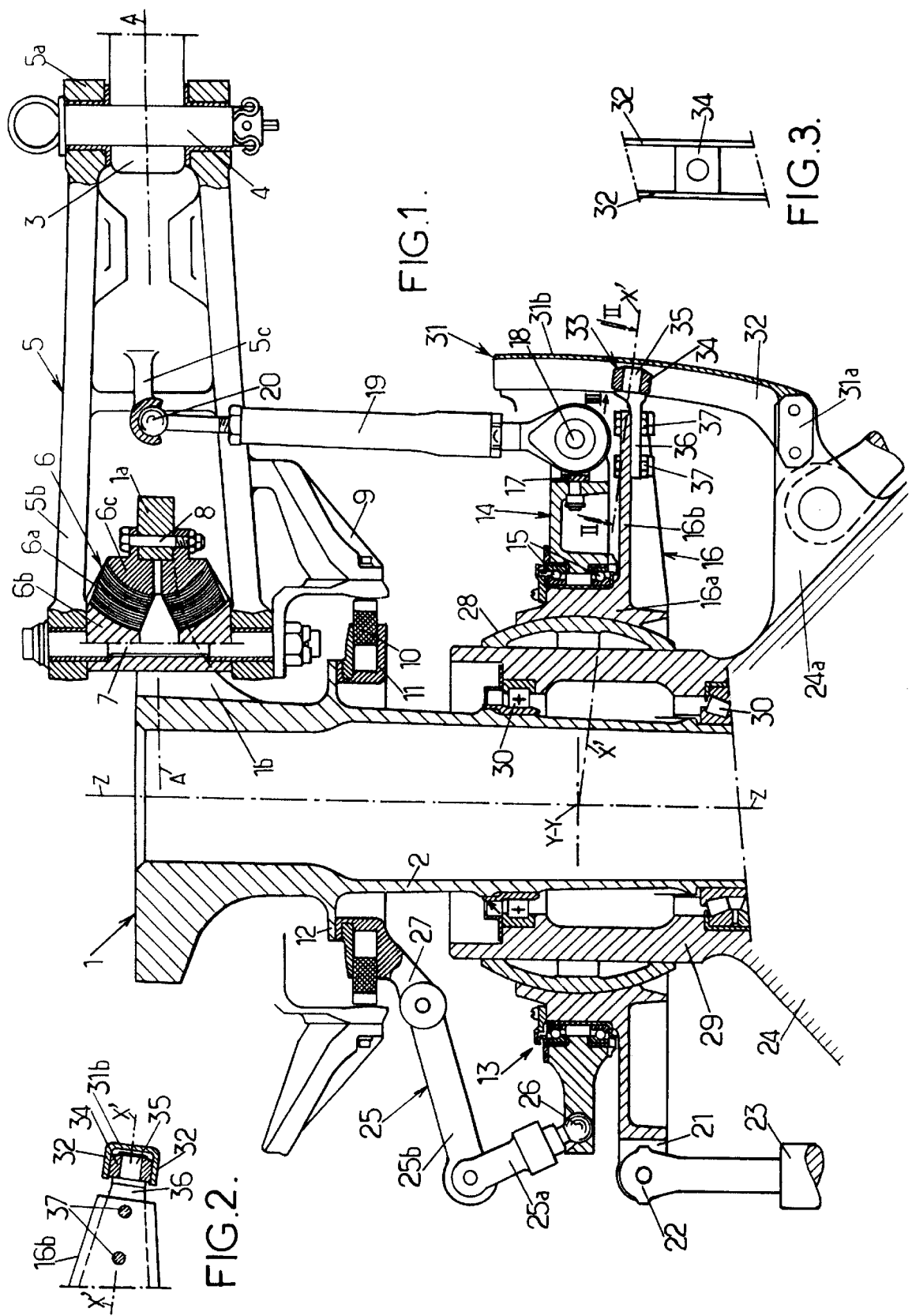

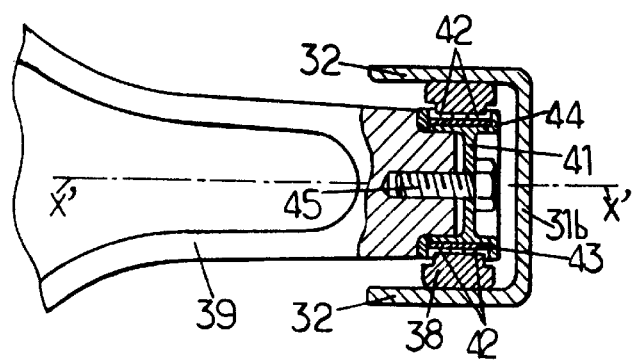
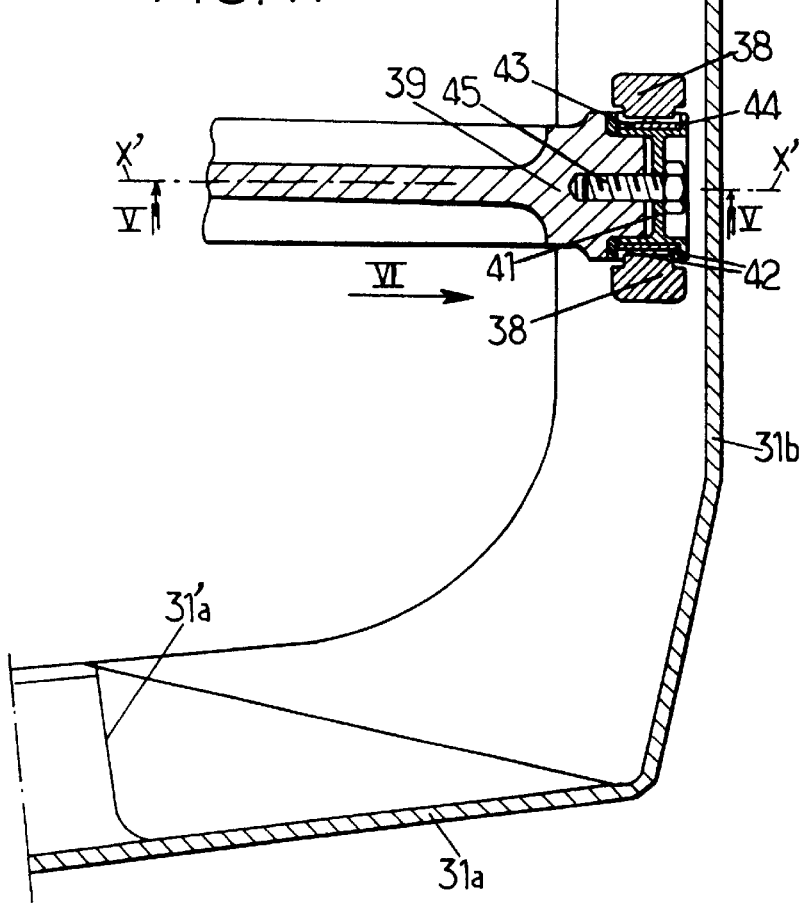
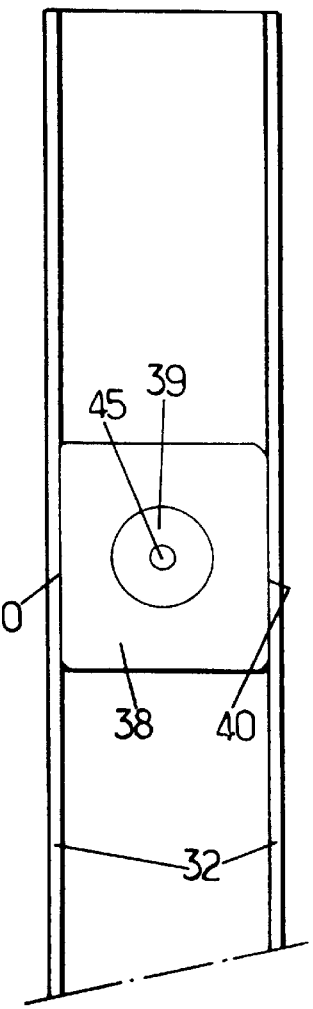

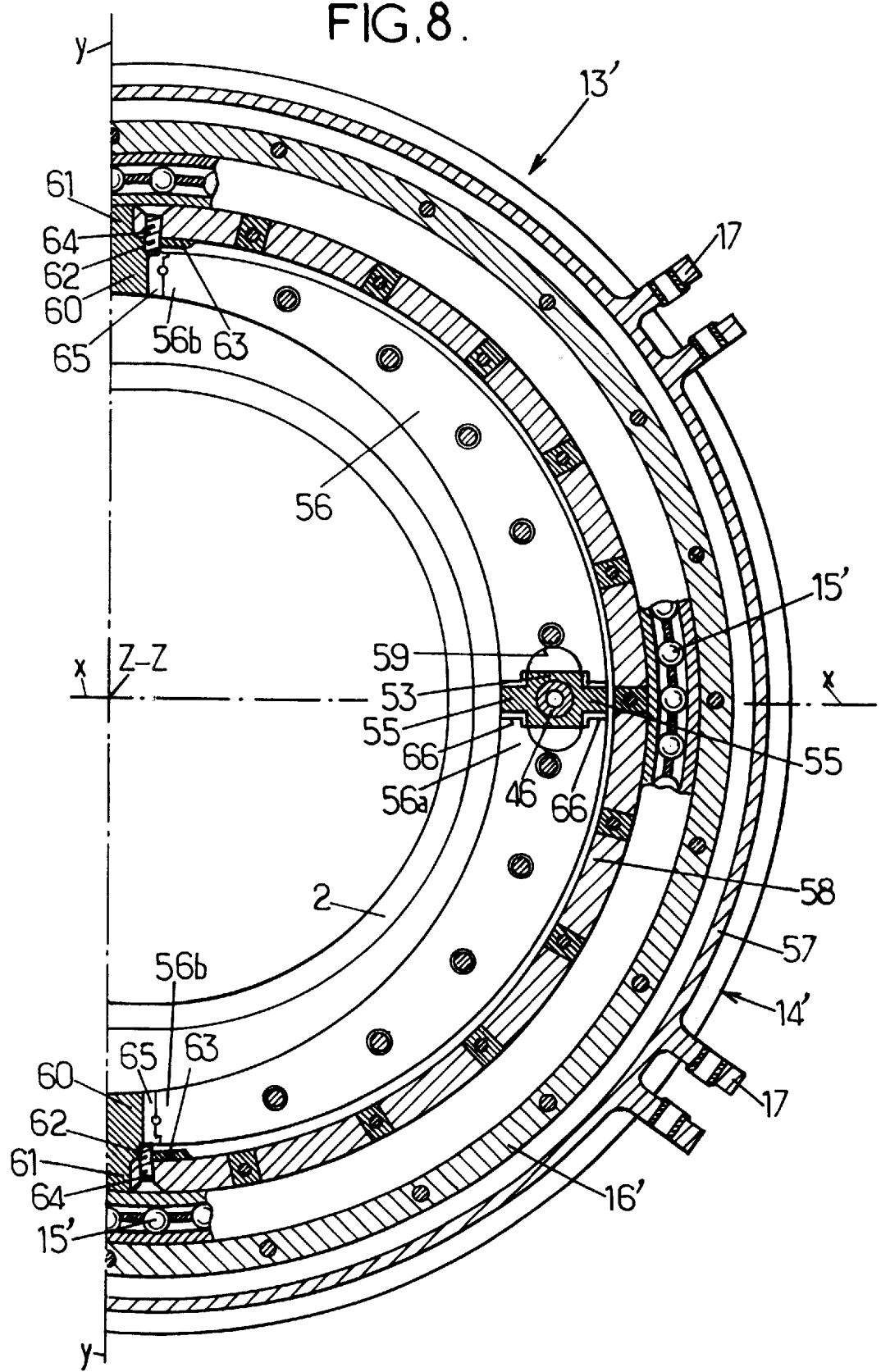

SWASH-PLATE DEVICE FOR CONTROLLING THE PITCH OF ROTOR BLADES WITH NON ROTATING PLATE STOP TRACK AND PIN

The invention concerns devices for controlling the pitch of rotor aircraft rotor blades, particularly a helicopter main rotor, the rotor being of the type for which each blade is, on the one hand, rotated around an axis of rotation of a rotor shaft, or rotor axis by means of a hub rotating integrally with the shaft, and, on the other hand, rotating integrally, around a blade pitch change longitudinal axis, with at least one pitch lever controlled by a corresponding pitch rod.

The invention relates more exactly to a pitch control device of the type including a swash-plate assembly, and such that each pitch rod is connected to a plate rotating with the rotor and belonging to the swash-plate assembly, in which the rotating plate is mounted to rotate on a non-rotating plate, restrained against any rotation around the rotor axis by a connection connecting the non-rotating plate to the structure of the rotor aircraft, the two plates being annular, surrounding the rotor axis and being able to be translated axially, i.e. parallel to the rotor axis, and tilted in any direction around the rotor axis, being activated by control actuators connecting the non-rotating plate to the structure for the control of respectively the collective pitch and the cyclic pitch of the blades.

Generally, the two plates surround the rotor shaft and the control actuators are three servo controlled jacks or similar actuators placed between the swash-plates and the rotor aircraft structure, and articulated by ball joints at their lower and upper ends respectively on this structure and in clevises of the non-rotating plate, whereas the pitch rods extend between the swash-plates and the pitch levers of the rotor blades and are articulated by ball joints at their upper and lower ends respectively on the pitch levers and in clevises distributed at the periphery of the rotating plate.

Most often, the swash-plates are translatable axially and able to be tilted by an axial translation and tilting guidance mechanism which includes a central ball joint centred on the rotor axis, and on which the non-rotating plate, and therefore the swash-plates are oscillating mounted, the ball joint being itself mounted sliding axially (parallel to the rotor axis) around a cylindrical guide coaxial to the rotor axis and not rotating around this rotor axis, and generally fixed in relation to the rotor aircraft structure. When the swash-plates surround the rotor shaft, which is most often the case, the cylindrical guide is tubular, surrounds the rotor shaft, and is fixed to a housing secured to the structure of the rotor aircraft and surrounding the connection between the rotor shaft base and the main gear box.

Most often also, the rotating and upper or non-rotating and lower connection unit or units which connect respectively the rotor to the rotating plate to rotate the latter, and the structure to the non-rotating plate, to restrain the latter, is or are one or more scissor-articulated torque links with two arms connected to each other by a pivot or a hinge, which enables the two arms of each torque link to move apart or draw together in order to enable movements in the direction of the rotor axis, since the upper and lower arms of a rotating torque link are moreover articulated on the shaft or the hub of the rotor and on the rotating plate respectively, and as the lower and upper arms of a non-rotating torque link are moreover articulated to the structure of the rotor aircraft and to the non-rotating plate.

The drawbacks of these rotating and non-rotating conventional torque links are that their articulations comprise traditional, unreliable, bearings, or, on more recent helicopters, ball joints and self-lubricating bearings including numerous carbide pins and rings, which are heavy and expensive.

Furthermore, a certain overall height or axial requirement (parallel to the rotor axis) and requirement in width is necessary for the conventional torque links to operate correctly. So, to facilitate their loading for example in the hold of a transport aeroplane and to improve their capacity to be accommodated in a hangar, for example of a ship, modern helicopters must offer the best possible vertical or axial compactness of the shaft and the main rotor assembly and of the swash-plate assembly which surrounds it. But reduction in the height or axial size of such an assembly is limited by the interference between the two arms of a conventional torque link during folding of the latter and by the maximum swivelling angles permitted by the construction of the hinge and ball joints of the conventional torque links.

The axial space requirement of a swash-plate control device with conventional torque link being mainly determined by the clearance of the torque links, on account of the folding and swivelling angles necessary for their operation, a proposal has already been made, in order to reduce the height of such an assembly, to eliminate either the rotating conventional torque link or links, or the non-rotating conventional torque link or links, and to use two guide pillars, parallel to each other and to the rotor axis and on either side of this axis in the same radial plane passing through the rotor axis, of a guidance mechanism for the axial translation and tilting of the swash-plates which also includes a cardan joint connection, with an intermediate ring mounted sliding axially with the help of the pillars, and pivot hinged on these pillars around a diametrical axis of the ring, which is an axis remaining perpendicular to the rotor axis, whereas the ring is pivot hinged on one of the swash-plates around another diametrical axis of the ring, which is perpendicular to the first diametrical axis, as proposed in DE-A-36 03 400 and DE-A-36 20 794. Thus, axial movements of the swash-plates and of the ring are guided by the two pillars, whereas tilting movements of the swash-plates in any direction around the rotor axis are obtained by pivoting the swash-plates in relation to the ring around one of the two diametrical and perpendicular axes of the ring, and by pivoting the ring on the pillars around the other of these two perpendicular diametrical axes.

The guide pillars can be rotating (rotating integrally with the rotor), and so too can be the ring mounted in this case between the rotating pillars, on the one hand, and, on the other hand, the rotating plate thus rotated by the pillars and the ring which replace the conventional rotating torque link or links. But the guide pillars can also be non-rotating, i.e. restrained against any rotation around the rotor axis by a support fixed to the structure of the rotor aircraft, in which case the ring is also non-rotating and assembled between, on the one hand, the non-rotating pillars, and, on the other hand, the non-rotating plate, thus restrained from rotating by the non-rotating pillars and the non-rotating ring, which replace the conventional non-rotating torque link or links.

If the pillar devices have the advantage of providing a saving in overall height (axial requirement) compared with conventional torque link devices, pillar devices do nonetheless have the drawbacks of a greater transverse space requirement, due to the greater diameter of the swash-plate assembly in order to house the intermediate ring between the swash-plates and the pillars, and low resistance to and poor control of vibration, which leads to avoiding the use of rotating pillars. Lastly, the use of rotating or non-rotating guide pillars does not prevent the simultaneous use of one or more conventional torque links rotating or non-rotating respectively, since a device comprising both non-rotating pillars and rotating pillars must be ruled out, in so far as it does not allow all the tilting movements required by the cyclic pitch controls and provided by the cardan ring.

The problem at the basis of the invention is to propose a swash-plate device for controlling pitch which comprises no non-rotating conventional torque link for stopping rotation of the non-rotating plate, and which comprises instead means enabling the axial space requirement of the pitch control device, and therefore of the mast-hub assembly of a main rotor to be reduced.

A further object of the invention is to propose a pitch control device in which the non-rotating torque link or links of conventional devices is or are replaced by non-rotating plate restrainers which are better suited to the various demands of practice, and which in particular comprise parts which are less numerous, less heavy, less expensive to manufacture, assemble and to maintain, and which generate less aerodynamic drag than conventional non-rotating torque links.

It is clear that the means of the invention, replacing conventional non-rotating torque links, must be able to be used in a pitch control device with a central ball joint sliding axially around a cylindrical guide or in a device with rotating guide pillars and a rotating cardan ring.

To this end, the pitch control device of the invention, of the type presented above, is characterised in that the connection connecting the non-rotating plate to the structure includes at least one rigid rotation stop track, extending at least in part substantially axially, parallel to the rotor axis, and secured to the rotor aircraft structure, the said track working together with a rotation stop pin, secured to the non-rotating plate, one of the two co-operating elements namely the said track and the said pin having two flanges between which the other element is engaged, so that the said stop pin follows on the said track a straight trajectory, parallel to the rotor axis, in the case of variation in the collective pitch, and a circular arc trajectory centred on the rotor axis, in the case of variation in the cyclic pitch.

In the device of the invention, the conventional non-rotating torque link is replaced by a rigid track, which does not bend and is not hinged and is capable of stopping the rotation of the non-rotating plate by working together with the stop pin of the latter. Simultaneously, the number of parts in the device is reduced, as is their mass, the result of which is to simplify the assembly and maintenance, and therefore to reduce the costs of production, assembly and maintenance, compared with a version with conventional nonrotating torque link.

In accordance with a version which has the advantage of being straightforward and rigid, the said stop track is delimited in a substantially axial groove of a non-rotating rigid arm fixed to the structure, and the stop pin is engaged in the said groove. For better resistance to fatigue and a better flexural and torsional rigidity, it is moreover advantageous for the said groove to be formed in a substantially axial part, having a "U" shaped transverse section, of the said non-rotating rigid arm, and for the corresponding stop pin to be engaged between the two flanges of the "U" shaped groove of the said arm.

In order to limit the transverse space requirement of the swash-plates, and therefore the drag, while preserving the aforementioned advantages, it is moreover advantageous for the "U" shaped groove to be open radially towards the rotor axis, and for the said stop pin to project substantially radially outwards from the non-rotating plate.

In a version which has the advantage of being rigid and straightforward for the connection of the rigid arm to the rotor, the said arm comprises to advantage an arm part substantially radial in relation to the rotor axis, and connecting its substantially axial arm part to fixing means on the structure of the rotor aircraft.

To take account of the fact that rotation stop loads may be unbalanced and alternate on the two flanges of the "U" shaped groove of the arm, in particular during variations in collective and cyclic pitch, the said stop pin includes to advantage at least one pad and/or at least one roller sliding and/or rolling respectively against one at least of the two flanges of the "U" shaped groove delimiting the corresponding stop track.

When the said pin includes a pad, this pad and the corresponding stop track comprise to advantage carbide coatings, at least in their mutual contact zones, so as to enable load transfers with reduced friction.

To this end, it is advantageous for the pad to be hinged in relation to the non-rotating plate, at least in rotation around an axis passing through the centre of the non-rotating plate, on the rotor axis, and, in a preferred version, the pad has two opposite side faces substantially plane and parallel to the flanges of the "U" shaped groove in which the pad slides, and the pad is assembled rotary and sliding around a pad fastening hub which is fixed on the external radial end of a pin-support arm of the non-rotating plate.

In a device in accordance with the invention, the arm with stop track and the stop pin of the non-rotating plate are combined with at least one rotating connection unit connecting the rotating plate to the rotor, and the structure of this or each rotating connection unit depends essentially on the structure of the connection between the swash-plates and the rotor shaft of the rotor aircraft.

The swash-plates may be translatable and able to be tilted by an axial translation and tilting mechanism which includes a central ball joint, centred on the rotor axis and on which ball joint the swash-plates are oscillating mounted, the said ball joint being mounted sliding parallel to the rotor axis around a cylindrical guide coaxial to the rotor axis and non-rotating around the said rotor axis, and preferably fixed in relation to the structure of the rotor aircraft, the rotation of the rotating plate being able then to be provided by at least one conventional rotating torque link, of standard structure, articulated on the one hand to the rotating plate and on the other hand to the rotor shaft.

But it is also possible for the swash-plates to be translatable and able to be tilted by an axial translation and tilting guidance mechanism which includes a cardan joint connection, with a ring rotating around the rotor axis, and four articulations arranged in two pairs of diametrically opposite articulations two by two in relation to the rotor axis, a first pair of articulations enabling the rotating plate to pivot on the rotating ring around a first diametrical axis of the ring, and the second pair of articulations enabling the ring to pivot around a second diametrical axis of the ring, which is perpendicular to the first diametrical axis and remains perpendicular to the rotor axis, and the ring to slide axially on and with the help respectively of two rotating guidance pillars, rotating integrally with the rotor, parallel to the said rotor axis and in a same radial plane passing through the latter, and forming rotating connection units driving the rotation of the rotating plate around the rotor axis.

Other characteristics and advantages of the invention will emerge from the description given below, in a non-restrictive way, of some versions described by reference to the appended drawings in which:

FIG. 1 is a diagrammatic and partial sectional view passing through the rotation axis of a helicopter main rotor equipped for example with an example of a pitch control device in accordance with the invention, FIG. 2 is a partial sectional view in accordance with II—II in FIG. 1, FIG. 3 is a partial view in accordance with the arrow III in FIG. 1, FIG. 4 is a larger scale view of a part of FIG. 1, showing a variant of the stop pin of the pitch control device of FIGS. 1 to 3, FIG. 5 is a sectional view in accordance with V—V of FIG. 4, FIG. 6 is a view in accordance with the arrow VI of FIG. 4, FIG. 7 is a partial view, similar to FIG. 1, of a rotor equipped with a second example of a pitch control device in accordance with the invention, and FIG. 8 is a partial transverse sectional view of the pitch control device of FIG. 7, On FIG. 1, the helicopter main rotor shown has a known structure: it includes essentially a hub 1 integral with the upper end of a tubular rotor shaft 2, rotated by its base around its axis Z-Z, which is the axis of rotation of the rotor. Each rotor blade 3 (only one of which is partly shown on FIG. 1) is restrained by its root, and with the help of two transverse pins such as 4, in an external radial clevis 5a of a unit 5 connecting the blade 3 to the hub 1. The unit 5, henceforward called a sleeve in the rest of the description, has an internal radial clevis 5b by which the sleeve 5 is connected to the hub 1 by restraining and articulation means 6, which restrain the sleeve 5 and the blade 3 against centrifugal forces, when the rotor rotates, and enable angular clearance of the sleeve 5 and of the blade 3 in pitch, around a pitch change longitudinal axis A-A, substantially radial in relation to the rotor axis Z-Z, and in flapping and in drag, in the known way.

In this example, the restraining and articulation means 6 include a spherical laminated bearing of known structure, with a laminated central part 6a, constituted by an alternate stacking of rigid cups and layers of elastomer in the shape of spherical caps centred approximately in the external radial edge 1a of a corresponding recess 1b of the hub 1, which is of the type with a dimpled radial plate, comprising as many axial recesses 1b as the rotor comprises blades 3. On either side of its central part 6a, the spherical laminated bearing 6, housed in the corresponding recess 1b, includes an internal radial frame 6b, assembled as a spacer between the branches of the internal clevis 5b of the sleeve 5 by threaded pins such as 7, and an external radial frame 6c fixed by screw-nut assemblies such as 8 on the external radial edge 1a of the corresponding recess 1b. The spherical laminated bearing 6 is thus connected to the hub 1 by its external frame 6c and to the sleeve 5 by its internal frame 6b.

For each blade 3, a bottom flap restrainer 9, fixed under the internal clevis 5b of the sleeve 5, works together with a droop restraining ring 10, of known structure, assembled sliding radially around the shaft 2 in a guidance ring 11 fixed, for example by bolting, to a external radial flange 12 of the shaft 2.

The shaft 2 is surrounded by a swash-plate assembly 13 of a blade 3 pitch control device, the sleeve 5 of each of which is equipped, to this end, with a pitch lever 5c projecting to the side from the sleeve 5, for example towards the leading edge of the corresponding blade 3.

The swash-plate assembly 13 includes two annular plates, surrounding the rotor shaft 2, and one of which is a rotating plate 14 assembled in rotation with the help of two ball bearings 15 around the central part 16a of the other plate 16 which is a non-rotating plate. External radial clevises, equal in number to the blades 3, are evenly distributed over the external periphery of the rotating plate 14, and in each clevis 17 is held a ball joint 18, articulating the lower end of a pitch control rod 19, on the rotating plate, the upper end of this rod 19 being articulated, also by a ball joint 20, in an end clevis of the pitch lever 5c of a corresponding blade 3. Under the rotating plate 14, the non-rotating plate 16 has three external radial clevises 21, one of which is for example directed towards the back of the helicopter and each of the two others laterally towards one of the two sides respectively of the helicopter, and in each of which is held a ball joint 22, articulating the upper end of one of three control actuators respectively, for example double acting linear servo controlled jacks, on the non-rotating plate 16, the lower end of each of said actuators being articulated, also by a ball joint (not shown) in a clevis of the structure of the helicopter, for example on the conical housing 24, which is fixed to the structure of the helicopter and surrounds the connection of the base of the rotor shaft 2 to the output of the main gear box, for rotating the shaft 2.

On its periphery and between the clevises 17, the rotating plate 14 is also articulated to two rotating units 25 (only one of which is shown), connecting the rotating plate 14 to the rotor shaft 2 to rotate the plate 14 around the axis Z-Z. This rotating unit can be a rotating torque link 25 of conventional structure, with two arms 25a and 25b pivot hinged onto each other, and one 25a by a ball joint 26 onto the rotating plate 14, and the other 25b pivoting in a clevis 27 of a torque link driver constituted, in this example, by the ring 11 fixed to the flange 12 of the shaft 2.

The two coaxial plates 14 and 16 may be translated axially, parallel to the rotor axis Z-Z, and tilted in any direction around this axis Z-Z by an axial translation and tilting guidance mechanism of known structure, which maintains the plates 14 and 16 centred on the rotor axis Z-Z. This guidance mechanism includes a central ball joint 28, on which the non-rotating plate 16 is oscillating mounted by its central part 16a, the ball joint 28 being centred on the rotor axis Z-Z and mounted sliding axially (parallel to the axis Z-Z) around a tubular cylindrical guide 29, coaxial to the rotor axis Z-Z and non-rotating around this axis, being integral with the conical housing 24. In this axial guide 29, fixed in relation to the structure of the helicopter, the shaft 2 is guided in rotation by two bearings 30.

The control of the three actuators 23 enables the two plates 14 and 16 and the ball joint 28 to be translated in accordance with the axis Z-Z along the guide 29 and/or the plates 14 and 16 to be tilted on the ball joint 28 in any direction around the axis Z-Z, in order to transmit variations in collective pitch and cyclic pitch respectively to the blades 3 by means of the rods 19.

The stop of the rotation of the non-rotating plate 16 around the axis Z-Z is provided by a stop arm 31 of the non-rotating plate 16. On FIG. 1, the arm 31 is a rigid arm fixed on an external radial support 24a integral with the conical housing 24 by a small substantially radial part 31a of the arm 31 constituting, in this example, the lower part connecting the arm 31 to the structure of the helicopter. The stop arm 31 is thus integral with the structure, below the swash-star assembly 13. The substantially radial (in relation to the axis Z-Z) part 31a of the arm 31 is prolonged upwards by a longer and substantially axial part 31b, generally parallel to the axis Z-Z, and slightly curved towards the axis Z-Z at its lower end connecting to the radial part 31a. The axial arm part 31*b* has a "U" shaped transverse section delimiting a groove open radially towards the rotor axis Z-Z. The internal faces of the two flanges 32 of the "U" shaped groove in the axial arm part 31*b* thus form a rigid rotation stop track of a stop pin 33 integral with the non-rotating plate 16, the pin 33 projecting substantially radially outwards from the non-rotating plate 16 and being engaged between the two flanges 32 of the "U" shaped groove of the axial arm part 31*b*.

The pin 33 may include a roller rolling in the "U" shaped groove, against one at least of the flanges 32 of the "U" shaped groove delimiting the stop track, and around the axis of the roller, which is an axis passing through the centre of the non-rotating plate 16 situated on the rotor axis Z-Z. The swash-plate assembly 13 may therefore be tilted simultaneously around the axis X'-X' of rotation of the roller of the pin 33, and around a second axis Y-Y of the plates 14 and 16, which is perpendicular to the axis X'-X' and to the rotor axis Z-Z, at their intersection, i.e. at the centre of the ball joint 28 and the plates 14 and 16, just like a cardan joint, with rotation stop of the non-rotating plate 16 by the engagement of the pin 33 in the "U" shaped groove 31*b*.

Preferably, in the example in FIG. 1, the stop pin 33 includes a pad 34 which slides between the two flanges 32 of the "U" shaped groove of the axial arm part 31*b* constituting a rigid slide. To reduce friction, the internal faces of the two flanges 32 and the two side and plane faces of the pad 34 which can each slide against one of the flanges 32 respectively have carbide coatings. Moreover, as also shown on FIGS. 2 and 3, the pad 34 is rotary mounted around the axis X'-X' passing through the rotor axis Z-Z, by sliding around a hub 35 at the external radial end of a pin-support arm 36 fixed by two screw-nut assemblies 37 under a radial branch 16*b* of the non-rotating plate 16. This articulation of the pad 34 around its fastening axis X'-X' on the nonrotating plate 16 enables the latter to swivel in any direction on the central ball joint 28.

In operation, the trajectory and the behaviour of the pad 34 are as follows : for variations in cyclic pitch, the pad 34 slides in the "U" shaped slide 31*b* of the stop arm 31 following a portion of a circular trajectory around the axis Y-Y. In the case of variation in collective pitch, the pad 34 slides in the "U" shaped slide 31*b* between the flanges 32 following a straight trajectory, parallel to the rotor axis Z-Z, upwards (towards the hub 1) or downwards (towards the structure and the conical housing 24) in accordance with the collective pitch required.

FIGS. 4 to 6 show a variant stop pin with pad, usable in place of the pin 33 with pad 34 of the previous figures.

In this variant, the pin includes a pad 38 sliding between the two flanges 32 of the "U" shaped slide 31*b* of the rigid arm 31, similar to that in the previous example. To facilitate load transfer between the pad 38 and the flanges 32, by reducing friction, the internal face of the flanges 32 may have a carbide coating on its zone corresponding to the trajectory of the pad 38, the external face zones of which, coming into contact with the flanges 32, may also have carbide coatings. Each pad 38 has the general external shape of a relatively flat rectangle parallelepiped, punched with a cylindrical central aperture of circular section. Through this aperture, each pad 38 may be articulated to rotate around the axis X'-X' in relation to the non-rotating plate 16, to which the pad 38 is connected by a pin-support arm 39 radial in relation to the centre of the non-rotating plate 16 and fixed to the plate 16 or of a single piece with the latter, made for example of aluminium, while the stop arm 31 is made for example of steel. The pad 38 thus has two opposite lateral faces 40 which are plane and parallel to each other and to the flanges 32 of the "U" shaped slide 31*b* in which the pad 38 slides, and by its central aperture the pad 38 is assembled rotary and sliding mounted around a pad fastening hub 41 on the external radial end of the pin-support arm 39. To this end, anti-friction shoulder rings 42 are assembled in the central aperture of the pad 38, and around an anti-friction ring 43 housed in the bottom of a "U" shaped groove delimited by an annular rim 44 at the periphery of the hub 41, which is centred by its rim 44 around the cylindrical external radial end of the pin-bearing arm 39 and kept against this end by the head of a screw 45 with a stem crossing the central part of the hub 41 and screwed into this end of the arm 39.

On FIG. 4, the pad 38 follows, in sliding between the flanges 32, the same trajectories as the pad 34 in the previous example, during variations in collective and cyclic pitch.

In this variant, the substantially radial part 31*a* of the stop arm 31 may have an "U" shaped structure open upwards, i.e. towards the swash-plate assembly 13, or a partly box-type structure shown in 31'*a* on FIG. 4, so as to offer greater rigidity, without constricting the fixing to the housing 24.

FIG. 7 shows partially a rotor of general structure approximately similar to that of the rotor in FIG. 1, except for the hub 1' which is tubular, flared, of a single piece with the shaft 2 and has apertures 1'*b* for passage of the lower branch of the internal clevises 5*b* of the sleeves 5 connecting the blades 3 to the hub 1', as described in FR-A-2 584 996.

Similar elements are therefore indexed by the same numerical references on FIGS. 1 and 7, but the rotor in FIG. 7 is equipped with a pitch control device different in so far as the swash-plate assembly is no longer guided in axial translation and tilting by a mechanism with a central ball joint sliding axially around a guide, but by a mechanism with two rotating axial guidance pillars and with a cardan joint with a rotating intermediate ring pivoting mounted, on the one hand, in relation to the pillars around a diametrical axis of the ring, and, on the other hand, on the rotating plate, around another diametrical axis of the ring, perpendicular to the first diametrical axis considered.

More exactly, two cylindrical pillars such as 46, parallel to each other and to the rotor axis Z-Z and symmetrical with each other in relation to the axis Z-Z in a same radial plane passing through this axis Z-Z, are fixed to the shaft 2 of the rotor and rotate with it around the axis Z-Z, being restrained from it by their upper and lower ends in upper 47 and lower 48 fixing tabs. Each upper fixing tab 47 is added by screwing directly on the external face of the shaft 2 in order to facilitate the assembly of the pillars 46, whereas each lower fixing tab 48 is radial and of a single piece with a ring 49 connecting the base of the shaft 2 by bolting to the output shaft 50 of the main gear box, this shaft 50 being guided in rotation by a single ball bearing 51 in the housing 24 fixed to the structure of the helicopter. The lower end of a pillar 46 is restrained in the tab 48 by a cup 52 screwed in the pillar 46.

On each pillar 46 is assembled axially sliding a slider 53 in the shape of a cross-brace. Each slider 53 comprises a tubular part 54, by which the slider 53 slides around the pillar 46, and two cylindrical trunnions 55, coaxial, projecting radially outwards from the tubular part 54 in relation to its axis and diametrically opposite on this tubular part 54.

As can also be seen on FIG. 8, a cardan ring 56 is assembled around the shaft 2 and between this shaft 2 and the rotating plate 14' of the swash-star assembly 13', this rotating plate 14' being different from that in the example in FIG. 1, but remaining connected in the same way to the blade pitch levers by the pitch rods 19. The rotating plate 14' has a "U" shaped transverse section with concavity turned towards the housing 24, and approximately envelops the non-rotating plate 16' and a single bearing 15' between its external annular skirt 57, which bears the clevises 17 connecting to the rods 19, and its internal annular skirt 58, by which the rotating plate 14' is rotary mounted, by the bearing 15', within the non-rotating plate 16', which still has, projecting downwards, articulation clevises (not shown) of the control actuators such as 23 on FIG. 1.

The ring 56 has two diametrically opposite parts 56a which are radially extended, and preferably axially thinned out, and in each of these extended parts 56a, the ring 56 is traversed by an oblong shaped axial aperture 59. In each of the apertures 59 of the ring 56 emerge two cylindrical bores, coaxial and radial, arranged one inwards and the other outwards from the ring 56, in order to receive the two trunnions 55 of a slider 53 traversing the corresponding aperture 59, and the four radial bores thus arranged in the ring 56 are coaxial around a same diametrical axis x-x of the ring 56. Sufficient circumferential clearance is provided between each aperture 59 and the slider 53 which traverses it to allow the ring 56 to pivot around its diametrical axis x-x, which is the axis of the trunnions 55 of the two sliders 53, in order to prevent any interference between the ring 56 and the sliders 53 during cyclic pitch changes, in the course of which the four trunnions 55 of the two sliders 53 rotate in the four radial bores emerging in the two apertures 59 of the ring 56.

Between its extended parts 56a, the ring 56 has two diametrically opposite parts 56b, which are radially thinned out but preferably axially oversized, and each one of which has one of two cylindrical bores, radial and coaxial respectively, around a same diametrical axis y-y of the ring 56, perpendicular to the other diametrical axis x-x of pivoting of the trunnions 55, and in each of which is engaged one of two cylindrical trunnions 60, projecting radially inwards from the rotating plate 14' and diametrically opposite inwards from the internal skirt 58 of the rotating plate 14' respectively. In this way, the rotating plate 14', and therefore also the non-rotating plate 16' which it supports, can pivot in relation to the ring 56 around the diametrical axis y-y on the trunnions 60 and, at the same time, the ring 56 can pivot around the other diametrical axis x-x on the trunnions 55 of the sliders 53, which can simultaneously slide axially along the rotating pillars 46.

In this version, the ring 56 is a rotating ring, rotated around the axis Z-Z by the sliders 53 and the rotating pillars 46, with the result that the rotating plate 14' is also rotated by the ring 56 and the aforementioned units which drive the rotation of the latter around the axis Z-Z. The two trunnions 60 and the four trunnions 55 define four articulations arranged in two pairs of diametrically opposite articulations two by two in relation to the axis Z-Z, a first pair of articulations, defined by the two trunnions 60, enabling the rotating plate 14' to pivot on the ring 56 around the diametrical axis y-y of the ring 56, and the second pair of articulations, defined by the four trunnions 55, enabling the ring 56 to pivot in relation to the sliders 53 and pillars 46, around the other diametrical axis x-x, which is perpendicular to the diametrical axis y-y and remains perpendicular to the rotor axis Z-Z, the axial sliding of the ring 56, and therefore of the rotating 14' and non-rotating 16' plates pivoted on it, being enabled by the sliders 53 along the rotating guidance pillars 46.

In accordance with FIG. 8, each trunnion 60 can be added to the rotating plate 14'. To this end, the cylindrical part of the trunnion 60, which is engaged in the corresponding bore of the ring 56, is prolonged outwards from the ring 56 by an axial tail 61, engaged in a corresponding bore of the rotating plate 14' and surrounded by a support flange 62 against the internal face of the internal skirt 58 of the plate 14', the flange 62 having two lugs 63 each fixed against the internal skirt 58 by a screw 64 traversing this skirt 58.

Furthermore, to facilitate the rotations of the trunnions 60 and 55, the bores housing them in the ring 56 are equipped with anti-friction shoulder rings 65 and 66 respectively.

Likewise anti-friction rings and/or coatings can be provided in the tubular part 54 of the sliders 53 and/or around the pillars 46.

For the rest, the pitch control device is approximately identical to that in FIGS. 1 to 3 in the version of the stop arm 31 of the non-rotating plate 16' with the substantially axial part 31b defining a "U" shaped slide in which the stop pin 33 with rotary pad 34 slides around its fastening axis X'-X' to the pin-support arm 36 fixed by bolting 37 under a radial branch of the non-rotating plate 16', as described above by reference to the previous example.

One difference however is that, on FIG. 7, the rigid arm 31 is fixed by the internal radial end of its radial part 31a directly against the housing 24 by a screw 67.

The pitch control devices of the invention described above, enable main rotor mast-hub assemblies to be made which have a smaller vertical or axial space requirement compared with known versions with conventional non-rotating torque links restraining the non-rotating plate of the swash-plate assembly.

Furthermore, the means of stopping rotation of the non-rotating plate as described above include fewer parts and are less heavy and less expensive to manufacture, assemble and maintain than versions with conventional rotating torque link.

In particular the branches of the conventional non-rotating torque links are eliminated, as are their articulations including carbide spindles and rings, which are heavy and expensive.

I claim:

1. A device for controlling the pitch of the blades of a rotor aircraft rotor on which each blade is, on the one hand, rotated around an axis of rotation of a shaft of the rotor by means of a hub rotating integrally with the shaft, and, on the other hand, rotating integrally, around a blade pitch change longitudinal axis, with at least one pitch lever controlled by a corresponding pitch rod, connected to a plate rotating with the rotor and belonging to a swash-plate assembly in which the rotating plate is mounted to rotate on a non-rotating plate, restrained against any rotation around the rotor axis by a connection connecting the non-rotating plate to the structure of the rotor aircraft, the two plates being annular, surrounding the rotor axis, and being able to be translated parallel to the rotor axis and tilted in any direction around the rotor axis, under the action of control actuators connecting the non-rotating plate to the structure, for the control of the collective pitch and the cyclic pitch respectively of the blades, wherein the connection connecting the non-rotating plate to the structure includes at least one rigid rotation stop track, extending at least in part substantially axially, parallel to the rotor axis, and integral in rotation with the structure of the rotor aircraft, said track working together with a rotation stop pin, integral in rotation with the non-rotating plate, one of the two co-operating elements namely said track and said pin having two flanges between which the other element is engaged, so that said stop pin follows on said track a straight trajectory, parallel to the rotor axis, in the case of variation in the collective pitch, and a circular arc trajectory centred on the rotor axis, in the case of variation in the cyclic pitch.

2. A device in accordance with claim 1, wherein said stop track is delimited in a substantially axial groove of a rigid non-rotating arm, fixed to the structure, and the corresponding stop pin is engaged in said groove.

3. A device in accordance with claim 2, wherein said groove is formed in a substantially axial part, having a "U" shaped transverse section, of said non-rotating rigid arm, and the corresponding stop pin is engaged between two flanges of the "U" shaped groove of said arm.

4. A device in accordance with claim 3, wherein said "U" shaped groove is open radially towards the rotor axis, and said stop pin projects substantially radially outwards from the non-rotating plate.

5. A device in accordance with claim 3, wherein said rigid arm comprises an arm part substantially radial in relation to the rotor axis, and connecting said substantially axial arm part to fixing means on the structure of the rotor aircraft.

6. A device in accordance with claim 3, wherein said pin includes at least one pad and/or at least one roller sliding and/or rolling respectively against one at least of the two flanges of the "U" shaped groove delimiting the corresponding stop track.

7. A device in accordance with claim 6, wherein said pad and said stop track comprise carbide coatings at least in their mutual contact zones.

8. A device in accordance with claim 6, wherein said pad is hinged in relation to the non-rotating plate, at least in rotation around an axis passing through the centre of the non-rotating plate on the rotor axis.

9. A device in accordance with claim 8, wherein said pad has two opposite side faces substantially plane and parallel to the flanges of the "U" shaped groove in which the pad slides, and the pad is rotary and sliding mounted around a pad fastening hub fixed on an external radial end of a pin-support arm of the non-rotating plate.

10. A device in accordance with claim 9, wherein the pin-support arm is fixed under the non-rotating plate.

11. A device in accordance with claim 1, wherein the swash-plates are translatable and able to be tilted by an axial translation and tilting guidance mechanism which includes a central ball joint, centred on the rotor axis and on which ball joint the swash-plates are oscillating mounted, said ball joint being mounted sliding parallel to the rotor axis around a cylindrical guide coaxial to the rotor axis and non-rotating around said rotor axis, the rotation of the rotating plate being provided by at least one rotating torque link articulated on the one hand to the rotating plate and on the other to the rotor shaft.

12. A device in accordance with claim 1, wherein the swash-plates are translatable and able to be tilted by an axial translation and tilting guidance mechanism which includes a cardan joint connection, with a ring rotating around the rotor axis, and four articulations arranged in two pairs of diametrically opposite articulations two by two in relation to the rotor axis, a first pair of articulations enabling the rotating plate to pivot on the rotating ring around a first diametrical axis of the ring, and the second pair of articulations enabling the ring to pivot around a second diametrical axis of the ring, said second axis being perpendicular to the first diametrical axis and remaining perpendicular to the rotor axis, and the ring to slide axially on and with the help respectively of two rotating guide pillars, rotating integrally with the rotor, parallel to said rotor axis and in a same radial plane passing through the latter, and forming rotating connection units rotating the rotating plate around the rotor axis.

13. A device in accordance with claim 12, wherein the first pair of articulations includes at least two first trunnions coaxial around the first diametrical axis of the ring, and diametrically opposite in relation to the centre of the ring, and projecting on one of two elements namely the rotating plate and the ring and each one swivel mounted in one of two coaxial and diametrically opposite bores respectively on the other of said two elements, and the second pair of articulations includes two sliders, each of which is mounted sliding axially along one of the two rotating pillars respectively, and on which sliders the said ring is pivoting mounted around said second diametrical axis by at least two second trunnions radial and diametrically opposite in relation to the centre of the ring, and coaxial around the second diametrical axis.

14. A device in accordance with claim 13, wherein each slider comprises at least one tubular part by which the slider is sliding mounted around the corresponding pillar, and each slider bears at least a second trunnion projecting radially in relation to the axis of the said pillar and swivel mounted in a radial bore of the ring.

15. A device in accordance with claim 14, wherein each slider has the form of a cross-brace with a tubular part sliding around a guide pillar, and two second trunnions projecting radially outwards from the tubular part and diametrically opposite in relation to the axis of said tubular part, said second trunnions rotating in radial bores of the ring, on either side of one of two apertures respectively provided in the ring for the passage of cross braces and guide pillars.

* * * * *